United States Patent [19]

Sawada et al.

[11] 4,299,524
[45] Nov. 10, 1981

[54] DEVICES FOR AUTOMATICALLY SUPPLYING TUBULAR WORKPIECES

[75] Inventors: Kiyoshi Sawada, Shizuoka; Nobuo Ozawa, Mishima; Katsuhiko Oota, Numazu; Takefumi Narahara; Masahiro Nakagawa, both of Yokohama, all of Japan; Yoshinobu Fujimori, deceased, late of Yokohama, Japan; by Tomoyoshi Fujimori, heir, Takaoka, Japan

[73] Assignees: Toshiba Kikai Kabushiki Kaisha; Nippon Kokan Kabushiki Kaisha, both of Tokyo, Japan

[21] Appl. No.: 113,217

[22] Filed: Jan. 18, 1980

[30] Foreign Application Priority Data

Jan. 24, 1979 [JP] Japan .................. 54-6974

[51] Int. Cl.³ .............................. B65G 59/02
[52] U.S. Cl. .................... 414/117; 414/745; 414/910
[58] Field of Search ........... 414/117, 120, 908, 910, 414/911, 745; 294/87 R, 67 C; 198/651, 488; 221/240, 88, 103, 112

[56] References Cited

U.S. PATENT DOCUMENTS

| | | | |
|---|---|---|---|
| 2,869,737 | 1/1959 | Thomas | 414/61 X |
| 2,940,624 | 6/1960 | Burt et al. | 294/87 R X |
| 3,101,852 | 8/1963 | Pearne | 414/110 X |
| 3,263,825 | 8/1966 | Elam | 414/745 |
| 4,153,211 | 5/1979 | Lenk et al. | 414/911 X |

Primary Examiner—F. J. Bartuska
Attorney, Agent, or Firm—Koda and Androlia

[57] ABSTRACT

In a device for picking up tubular workpieces sequentially from a stack, and supplying the same to a subsequent stage, at least one truck is provided so as to be reciprocable between a loading position and an unloading position. In the loading position, the tubular workpieces are stacked up on the truck in an orderly manner into a number of layers, each layer including a plurality of rows each including a number of axially aligned tubular workpieces. A workpiece carrying bar reciprocable between an advanced position passing through the inner bores of a row of the tubular workpieces and a retracting position freeing the row, device for shifting the workpiece carrying bar horizontally and vertically, and devices for controlling the operation of the aforementioned devices are further provided.

7 Claims, 16 Drawing Figures

DEVICES FOR AUTOMATICALLY SUPPLYING TUBULAR WORKPIECES

BACKGROUND OF THE INVENTION

This invention relates to a device for supplying tubular workpieces such as couplings adapted to interconnect pipes and mounted on a truck, sequentially to a subsequent stage where the workpieces are combined with other members such as sections of pipes.

Heretofore, the tubular workpieces such as couplings, particularly of medium sizes are encased by a manufacturer in boxes or placed on pallets in an orderly manner, and then delivered to an assembling shop to be coupled with pipes, for example.

In order to pick up the tubular workpieces stacked up in an orderly manner, and to sequentially supply the workpieces to the subsequent assembling stage, various apparatus have been used. For instance, an electromagnet of a specific design has been utilized for attracting and transporting the tubular workpieces made of magnetic material, from the stack to the subsequent stage. Such an expedient, however, is found to be disadvantageous, because some of the tubular workpieces tend to drop or displace, thus hampering the resulting orderly supply of the tubular workpieces to the subsequent stage.

SUMMARY OF THE INVENTION

A primary object of the present invention is to provide a device for automatically supplying tubular workpieces stacked up in an orderly manner to a subsequent stage, which is simple and economical in construction, and reliable in operation.

Another object of the invention is to provide a device for automatically supplying tubular workpieces to a subsequent stage, the device being adjustable for handling tubular workpieces of various sizes and arrangements.

Still another object of the invention is to provide a device for automatically supplying tubular workpieces to a subsequent stage, which is fully automated, and after an initial adjustment, the device can supply all of the tubular workpieces automatically to the subsequent stage.

These and other objects can be accomplished by providing a device for automatically supplying tubular workpieces to a subsequent stage, the device comprising at least one carriage reciprocable between a loading position and an unloading position, in the former position the carriage being loaded with a stack of tubular workpieces in the form of a plurality of overlaid layers, each including a plurality of transversely aligned rows, and each row including a number of longitudinally aligned tubular workpieces, and in the latter position the tubular workpieces thus stacked up being delivered sequentially, a stational horizontally extending structural frame provided near the unloading position, a movable frame reciprocable horizontally on the structural frame in a direction perpendicular to the length of the tubular workpieces stacked up on the carriage, a pick-up member mounted on the movable frame to be movable vertically, a workpiece carrying bar provided on the pick-up member to be reciprocable horizontally in the longitudinal direction of the tubular workpieces through the internal bores thereof arranged in a row, and means for controlling the movable frame and the pick-up member so that the axial line of the workpiece carrying bar successively coincides with the longitudinal axes of the tubular workpieces stacked up on the carriage in layers and rows.

In a modification of the present invention, two carriages are provided which are alternately reciprocable between their respective loading positions and a single unloading position by means of hydraulic devices.

In another modification of the invention, the aforementioned means for controlling the pickup member comprises a detecting device mounted on the pickup member for detecting the upper surface level of the tubular workpieces stacked up on a carriage, and for controlling the lowering movement of the pickup member.

In still another embodiment of the invention, the aforementioned means for controlling the movement of the movable frame comprises a plurality of dogs provided on the structural frame at positions corresponding to those of the tubular workpieces arranged in rows in each layer, and a proximity switch secured to the movable frame for sensing the plurality of dogs.

DESCRIPTION OF PREFERRED EMBODIMENT

Figure 1:
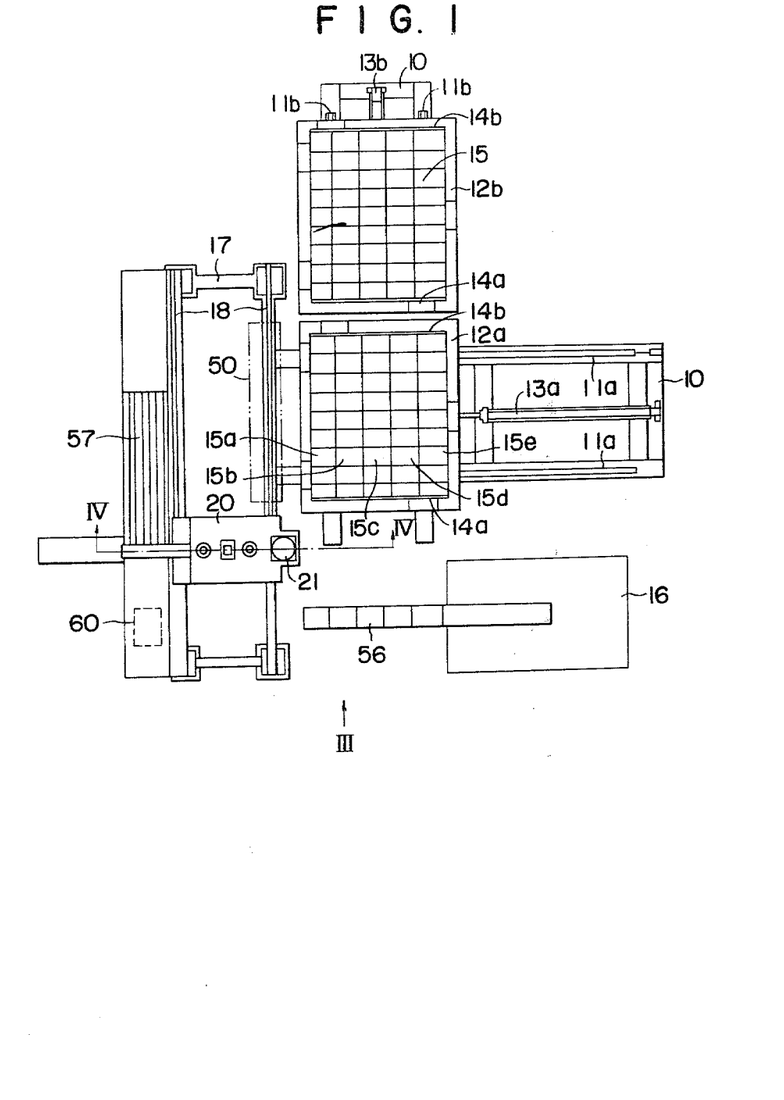
FIG. 1 is a plan view of a tubular workpiece supplying device according to the present invention.

Referring to FIG. 1 showing a preferred embodiment of the present invention, there is provided a base structure 10 of an L-shape. Two pairs of rails 11a and 11b are secured on the upper surface of the base structure 10, so that the rails 11a and 11b extend along the two arms of the L-shaped structure 10, respectively, and intersect at right angles at the joint of the two arms.

Two trucks 12a and 12b respectively coupled with piston rods 13a and 13b reciprocable within hydraulic cylinders 13a and 13b are mounted on the two pairs of rails 11a and 11b, respectively. When the hydraulic cylinders 13a and 13b are operated alternately, the two trucks 12a and 12b are alternately moved from loading positions at the ends of the L-shaped base structure 10 to an unloading position provided at the intersecting portion of the two pairs of rails 11a and 11b, and vice versa.

Figure 2:
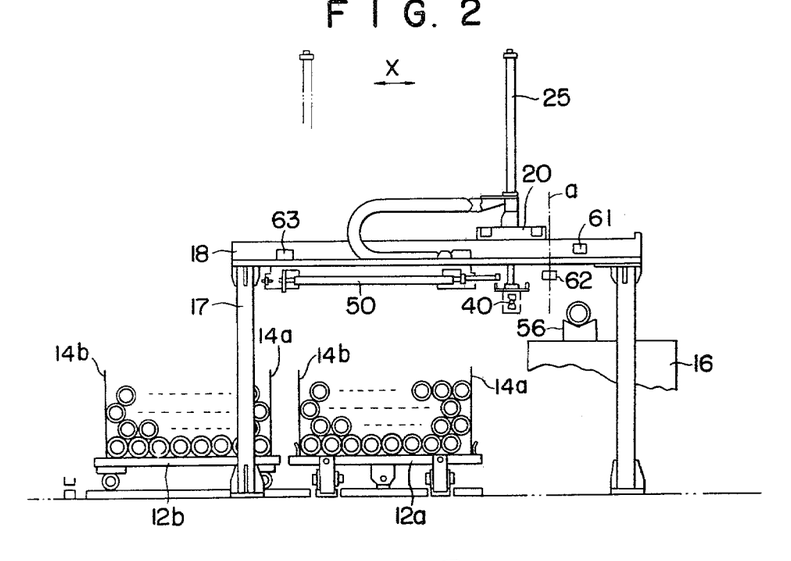
FIG. 2 is a side view as seen in the direction of arrow II in FIG. 1.
Figure 3:
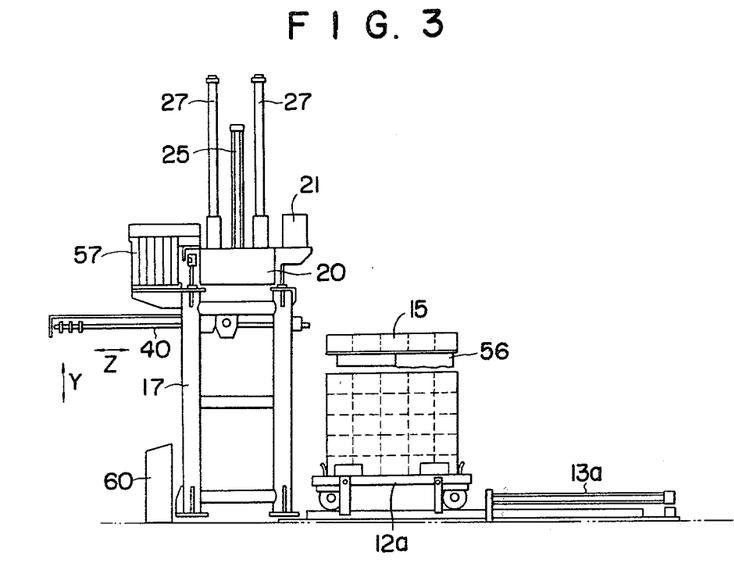
FIG. 3 is an elevational view as seen in the direction of arrow III in FIG. 1.

The opposite side of the stacked tubular workpieces 15, such as couplings, are neatly aligned by two side plates 14a and 14b as best illustrated in FIG. 2. While the side plate 14a is fixed to the truck 12a or 12b, the side plate 14b is adjustable in some extent forwardly or backwardly relative to the truck.

The tubular workpieces which are taken out of boxes or pallets (not shown) are loaded on the trucks 12a and 12b at the loading positions in an orderly manner between the side plates 14a and 14b.

More specifically, the tubular workpieces 15 are stacked on the floor of each truck between the two side plates 14a and 14b in the form of a number of layers, each layer including a plurality of rows, and each row including tubular workpieces 15a, 15b, 15c, . . . which are aligned in their longitudinal axes, and since the position of the side plate 14b is adjusted in accordance with the diameter of the tubular workpieces and the number of rows in each layer, the tubular workpieces thus stacked are tightly held between the two sides plates, and any lateral movement of the tubular workpieces is substantially prevented.

As shown in FIGS. 1 and 2, the device according to this invention further comprises a transferring mechanism 16, which transfers the tubular workpieces unloaded from the trucks to, for instance, assembling machines (not shown) in the subsequent stage. A stational structural frame 17 is also provided on one side of the unloading position where the tubular workpieces are unloaded from the trucks. The structural frame 17 generally extends horizontally in a direction perpendicular to the lengths of the tubular workpieces loaded orderly on the trucks 12a and 12b as described before.

Figure 4:
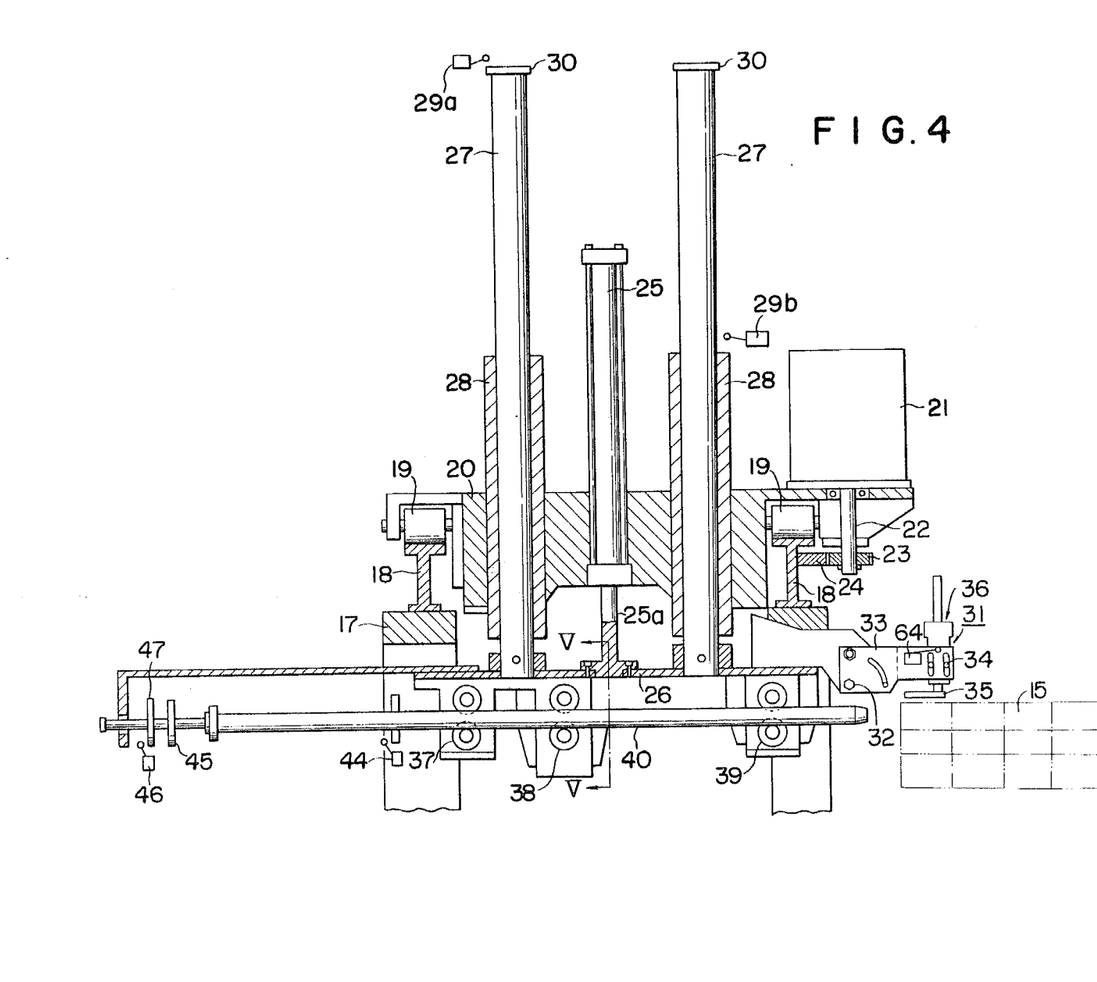
FIG. 4 is an enlarged view partly, in section, taken along the line IV—IV in FIG. 1.

As best illustrated in FIG. 4, a pair of spaced rails 18, are provided along the length of the structural frame 17, and a movable frame 20 having wheels or rollers 19 is supported on the rails 18 to be movable freely.

On the movable frame 20, is mounted a driving motor 21. A pinion 23 provided at the lower end of the driving shaft 22 of the motor 21 engages with a rack 24 provided along one of the rails 18, so that when the motor 21 is driven in either one of the two direction, the movable frame 20 is driven along the rails 18 in the corresponding direction.

To a central part of the movable frame 20, is secured a hydraulic cylinder 25, so that the cylinder 25 extends vertically through the frame 20. A pick-up member 26 is secured to the lower end of a piston rod 25a reciprocable within the hydraulic cylinder 25.

A pair of guiding sheaths 28 are also secured to the movable frame 20 on both sides of the hydraulic cylinder 25, so that the guide sheaths 28 extend vertically through the frame 20. A pair of cylindrical bars 27 extend slidably within the guiding sheaths 28, and the pick-up member 26 is secured to the lower ends of the cylindrical bars 27. With this arrangement, the pick-up member 26 is movable vertically upon operation of the hydraulic cylinder 25 while being guided by the guiding sheaths 28 and while maintaining its horizontal orientation.

An upper limit detecting switch 29a and a lower limit detecting switch 29b are further provided to be engageable respectively with engaging pieces 30 secured to the upper ends of the cylindrical bars 27 for detecting the upper and lower limiting positions of the pick-up member 26.

On the pick-up member 26, there is further provided a detecting device 31 for detecting the uppermost level of the tubular workpieces 15 stacked up on the truck 12a or 12b which is brought into the unloading position. More specifically, a bracket 33 is pivotally supported around a bolt 32 fixed to the pick-up member 26 at an end facing the truck 12a or 12b. By the bracket 33, an adjustable member 36 is supported so that the vertical position thereof is adjustable by means of adjusting bolts 34. A feeler 35 is slidably mounted through the adjustable member 36 and is held in position by means of a spring (not shown). A limit switch 64 including a proximity switch, not shown, is included in the detecting device 31 for detecting the upper surface as will be described hereinlater in more detail.

Figure 5:
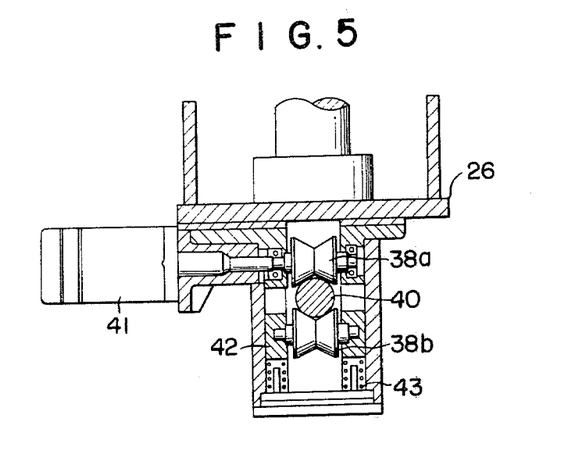
FIG. 5 is an enlarged sectional view taken along the line V—V in FIG. 4.

On the under side of the pick-up member 26, are provided pairs of rollers 37, 38, and 39. A workpiece carrying bar 40 is passed between the nips of the pairs of rollers so as to extend perpendicularly to the direction of movement of the movable frame 20. As shown in FIG. 5 among the pairs of rollers 37, 38, and 39, for instance, a pair of rollers 38 have an upper roller 38a directly coupled with the driving shaft of a hydraulic motor 41, and a lower roller 38b whose bearings 42 are urged upward by springs 43. Due to the force of the lower roller 38b, the workpiece carrying bar 40 is forced in contact with the upper roller 38a, and is reciprocated in the longitudinal direction when the upper roller 38a is driven by the hydraulic motor 41. Engaging pieces 45 and 47 engageable with limit switches 44 and 46 are provided on the workpiece carrying bar 40 for limiting the forward and backward movements of the workpiece carrying bar 40, respectively.

Figure 6:
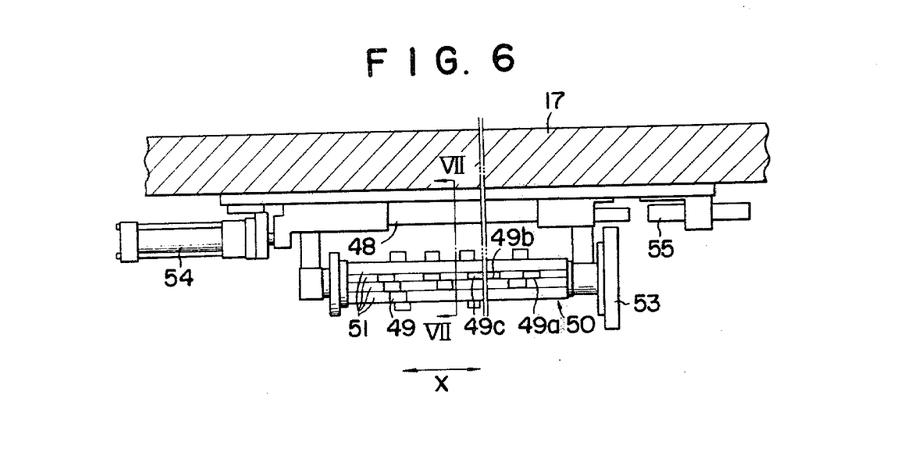
FIG. 6 is an enlarged view showing a position detecting device of this invention.

As is clearly seen in FIG. 6, a supporting member 48 is provided on the structural frame 17 supporting the movable frame 20, so that the position of the supporting member 48 is adjustable relative to the structural frame 17 in the same direction as that of the movement of the movable frame 20. A cylindrical member 50 having a number of dogs 49 fixed to the peripheral surface thereof is supported by the supporting member 48 such that the member 50 is rotatable about its central axis.

A plurality of longitudinal grooves 51 are formed equiangularly around the peripheral surface of the cylindrical member 50. A number of dogs 49a, 49b, 49c, . . . are secured in the grooves 51 such that the positions of the dogs are adjustable in the longitudinal direction of cylindrical member 50. At an end of the cylindrical member 50 is provided an indexing plate 53 which is adapted to bring the dogs provided in a specific groove 51 to positions aligning with a proximity switch 52 secured to the movable frame 20 (see FIG. 7).

Figure 7:
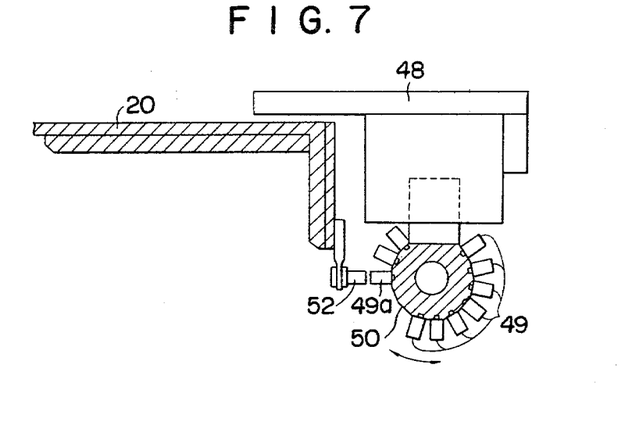
FIG. 7 is a sectional view taken along the line VII—VII in FIG. 6.

Thus when the movable frame 20 is moved and the proximity switch 52 secured to the movable frame 20 is brought into a position facing the dog 49b, 49c, . . . or else on the cylindrical member 50, the workpiece carrying bar 40 is brought into vertical alignment with the first, second, . . . or other row of the tubular workpieces in the uppermost layer of the stack.

The dog 49a in each groove 51 of the cylindrical member 50 is provided at a position preceding the dog 49b by a suitable distance.

A hydraulic cylinder 54 is provided at one end of the supporting member 48 for forcing the supporting member 48 toward a limiter 55 which is secured to the structural frame 17 for restricting the displacement of the supporting member 48 to a distance corresponding to ½ pitch between two adjacent rows in each layer of the stack of the tubular workpieces.

A workpiece transfer mechanism 16 having a workpiece receiving pedestal 56 is provided on the delivery side of the unloading position as best shown in FIG. 1. The workpiece receiving pedestal 56 extends in parallel with the rows of the tubular workpieces stacked on either one of the trucks 12a and 12b, and is placed at a position laterally aligned with the rows of the stack.

The workpiece transfer mechanism 16 may be of any suitable type known in the art, so that detailed description thereof is omitted. Electric cables and hydraulic pipe lines are generally indicated at 57.

Figure 8A:
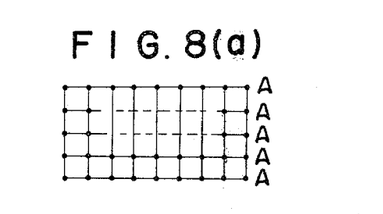
FIGS. 8(a) and 8(b) are diagrams showing two kinds of arrangement of the tubular workpieces mounted on a truck.
Figure 8B:
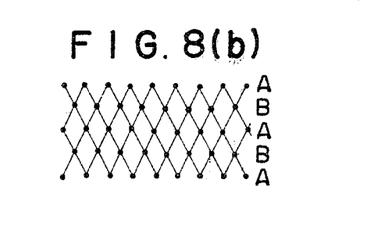

The rows of the tubular workpieces stacked up in the form of layers on the truck 12a or 12b may be arranged in two ways as schematically indicated in FIGS. 8(a) and 8(b). FIG. 8(a) indicates an orthogonal arrangement where the numbers of rows of the tubular workpieces in different layers are equal to A, while FIG. 8(b) indicates a staggered arrangement wherein the numbers of rows of the tubular workpieces are different in respective layers. That is, the number of rows of the tubular workpieces in odd-numbered layers counted from the lowermost layer on the truck are made to be equal to A, while the number of rows in even-numbered layers of the stack are made to be B.

Figure 9:
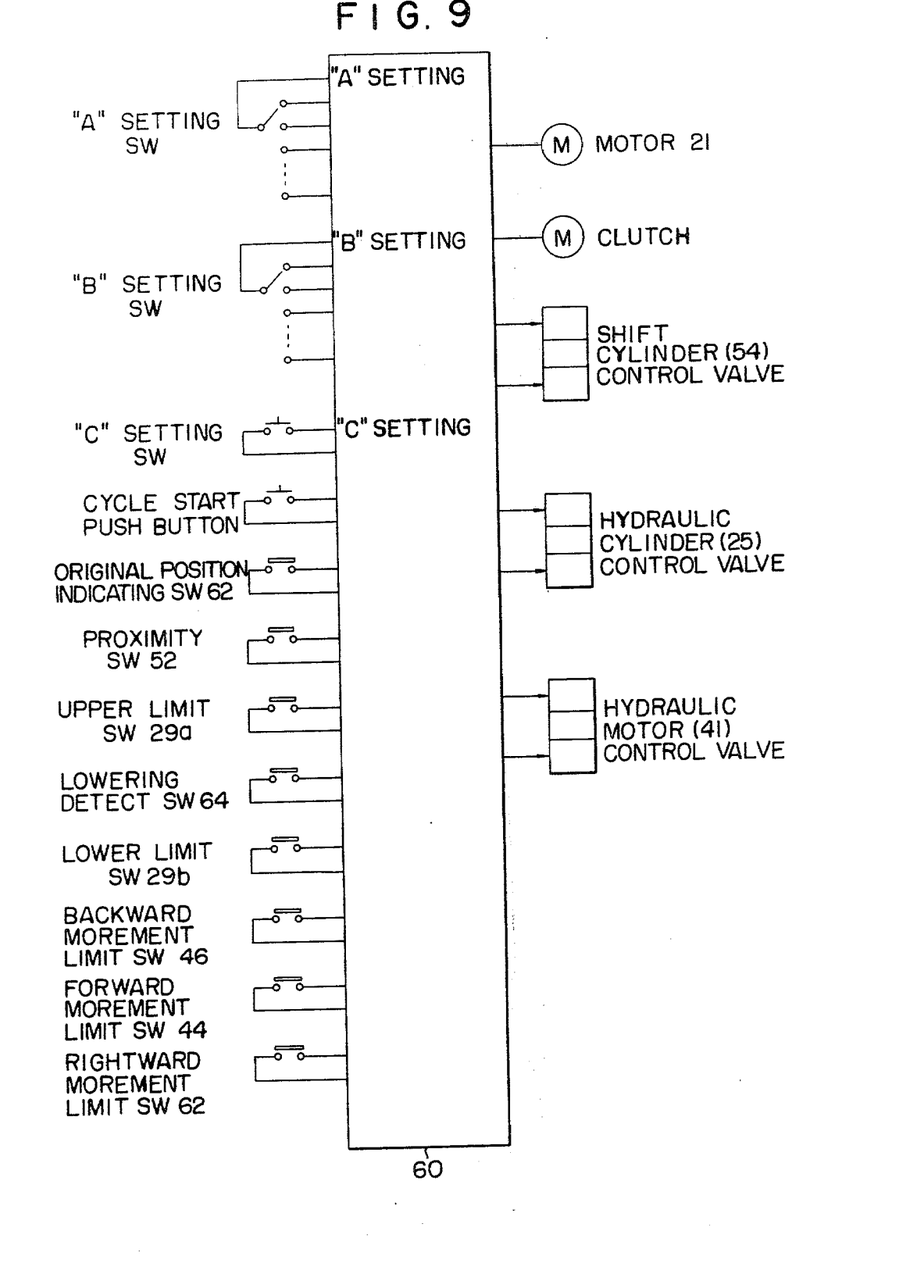
FIG. 9 is a schematic diagram showing a control panel and its inputs and outputs.
Figure 10A:
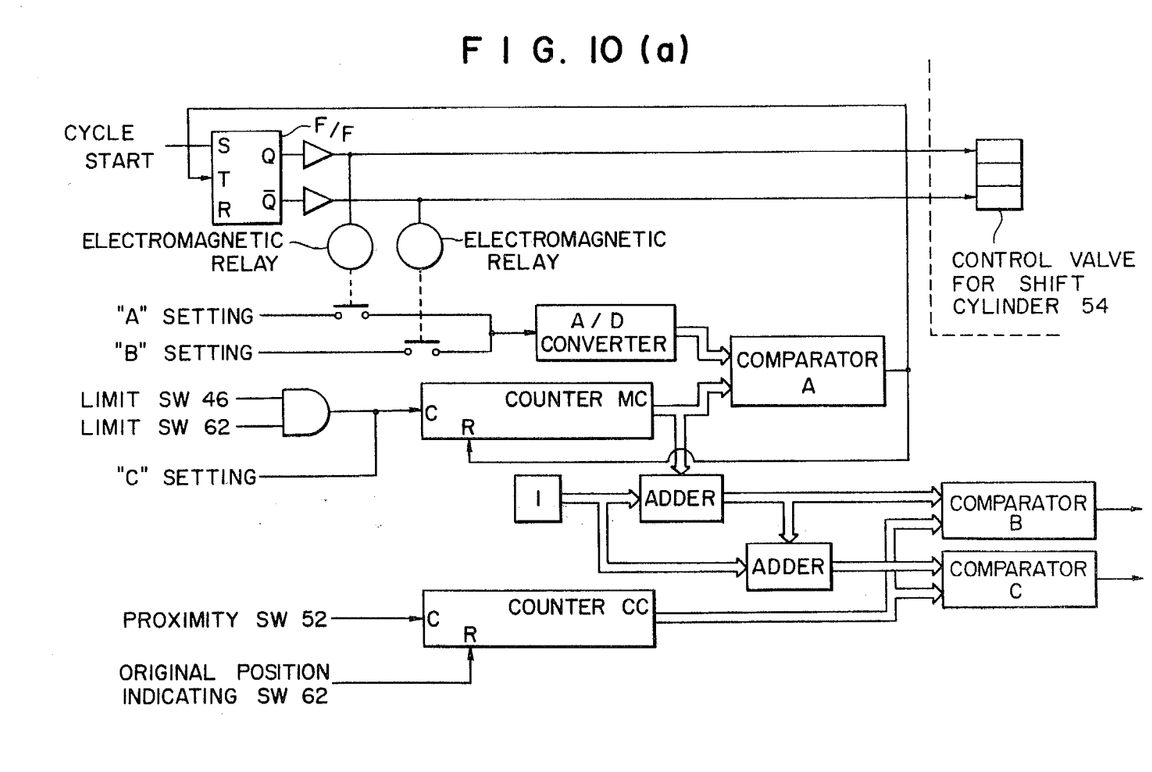
FIGS. 10(a), 10(b), and 10(c) are block diagrams showing the detail of the control circuit.
Figure 10B:
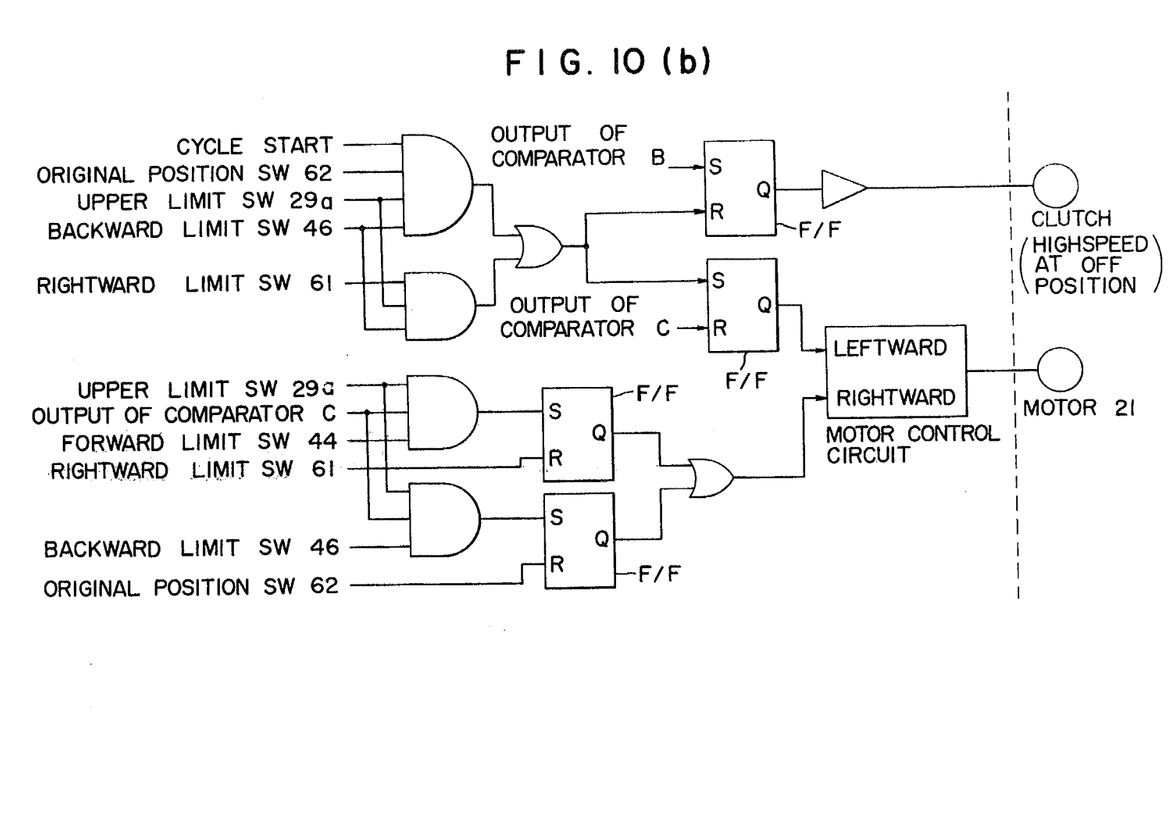
Figure 10C:
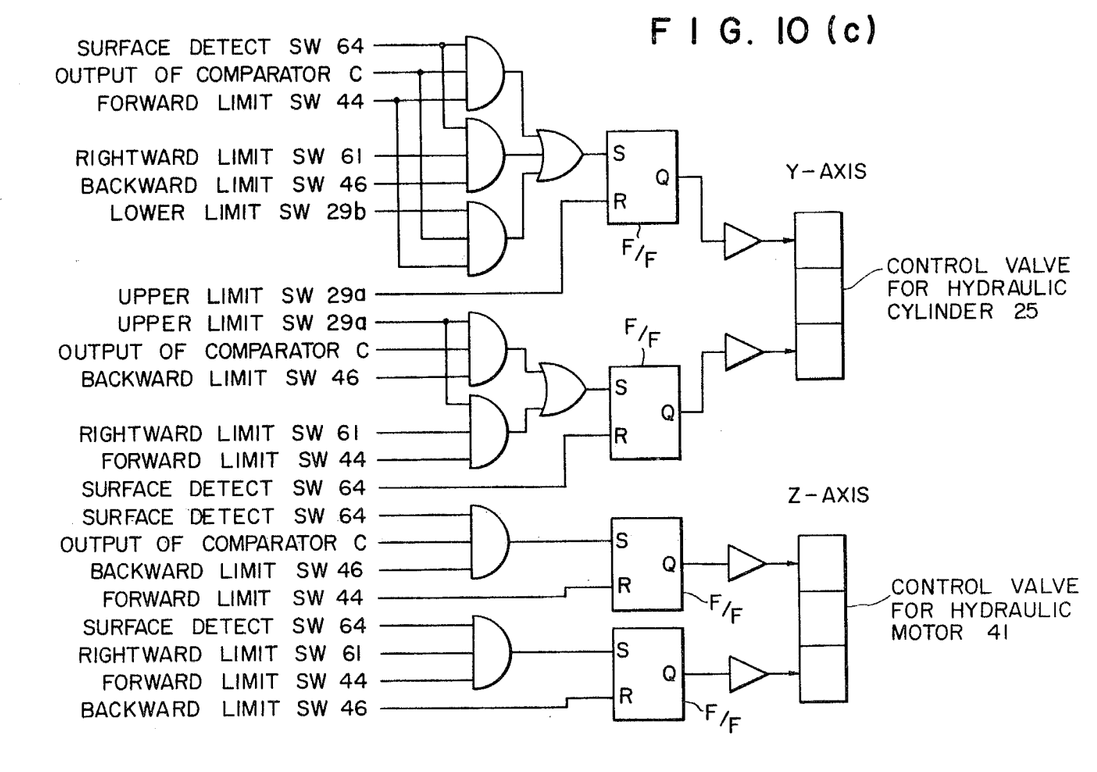
Figure 11A:
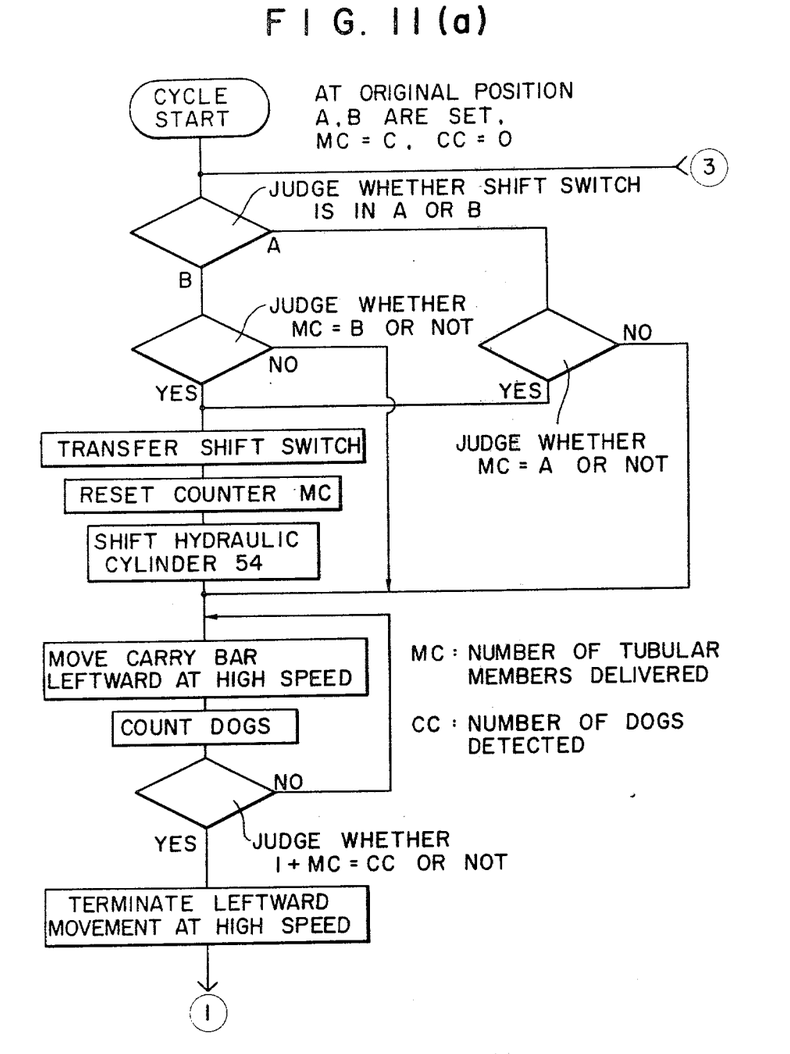
FIGS. 11(a), 11(b), and 11(c), when combined, show a flow chart for explaining the operation of the present invention.
Figure 11B:
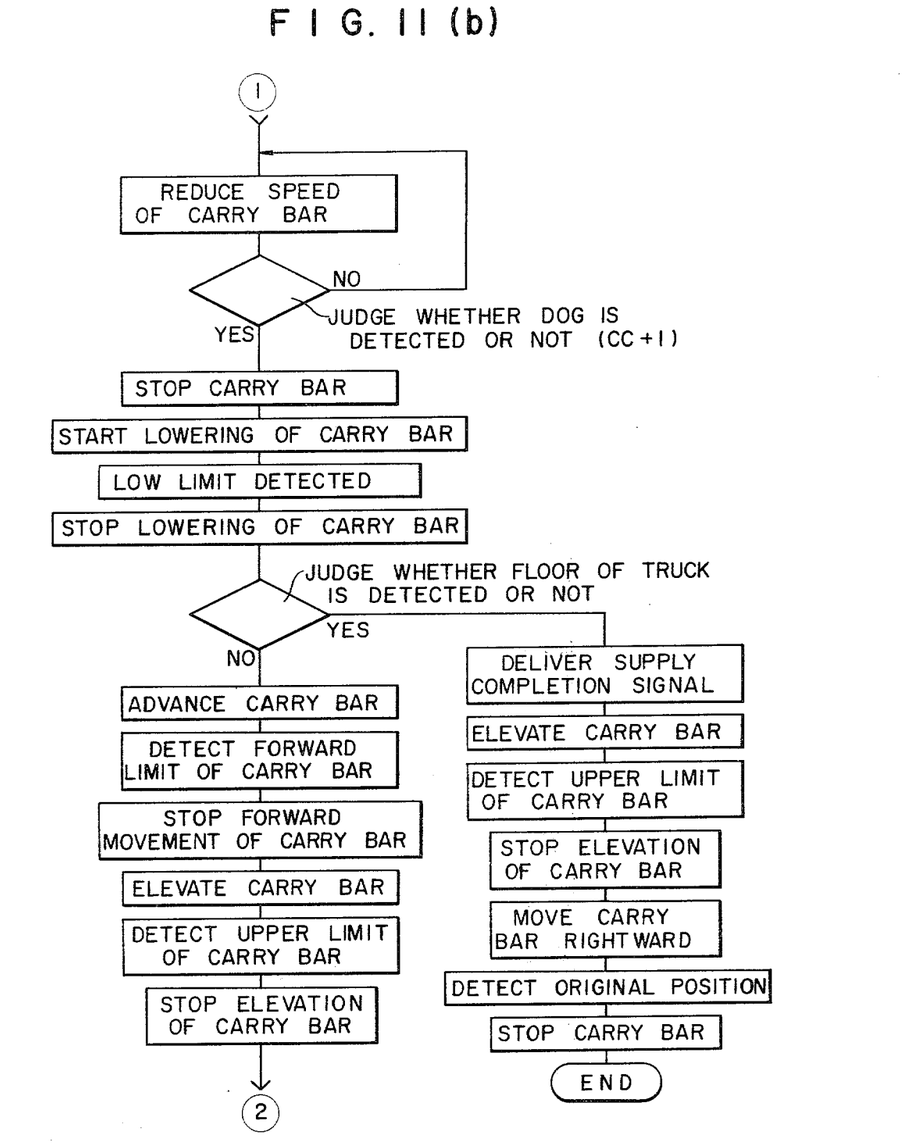
Figure 11C:
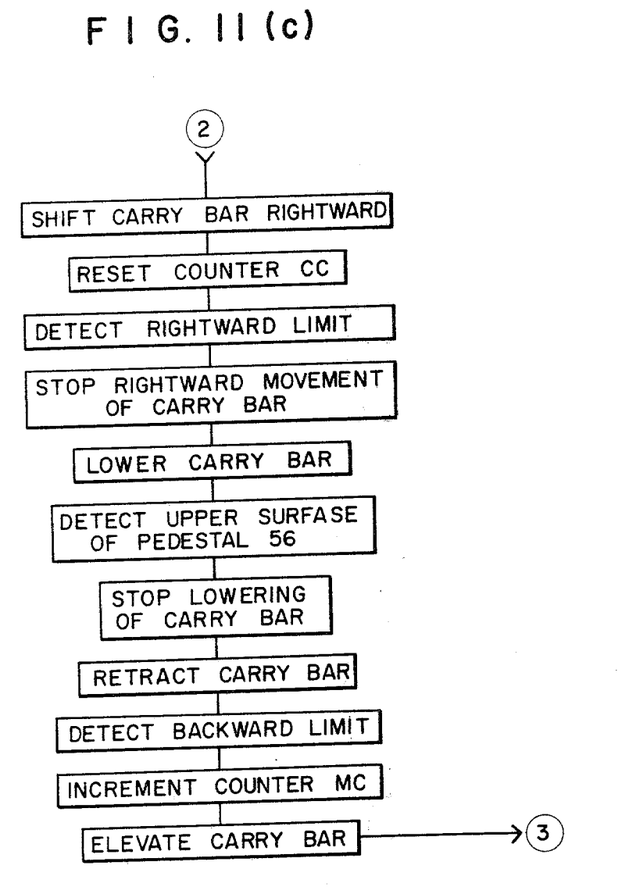

The tubular workpiece supplying device of this invention further comprises a control panel 60 which is installed at a suitable position near the structural frame 17. The control panel 60 includes devices for setting a number, such as A, of the rows of tubular workpieces contained in any one of the odd-numbered layers in the stack, another number, such as B, of the rows of the same contained in any one of the even numbered layers in the stack, and still another number C indicative of a condition in which the number of the workpieces in the uppermost is smaller than that of another layers.

The control panel 60 further includes a shift switch, a MC counter counting the number of rows delivered out of a specific layer of the stack, and a counter CC counting the number of dogs 49a, 49b, . . . when these are sensed by the proximity switch 52. Various logic circuitries and comparators are also provided in the control panel 60 for controlling the operations of the electric motor 21, hydraulic cylinder 25, and the hydraulic motor 41.

For controlling the operation of the electric motor 21, limiting switches 61 and 63 are provided along the rail 18 at a rightmost position vertically aligning with the workpiece receiving pedestal 56 and at a position upwardly leftward of the adjustable side plate 14b of the truck 12a, respectively, as viewed in FIG. 2. Another limit switch 62 is provided at any arbitrary position between the rightmost limiting switch 61 and the first dog 49a for defining the original position "a" of the workpiece carrying bar 40.

The operation of the tubular workpiece supplying device according to the present invention will now be described with reference to FIGS. 9, 10(a)–10(c) and 11(a)–11(c).

In the following description, it should be understood that rightward and leftward and upward and downward movements of workpiece carrying bar are defined with respect to FIG. 2 in which the truck 12b is in the loading position and the truck 12a is in the unloading position. It is further assumed that, in an original state, the movable frame 20 and the pick-up member 26 are moved to the positions bringing the center line of the workpiece carrying bar 40 to the original position "a".

By this instant, numbers A, B, and C representing the number of rows in the odd-numbered layers and even-numbered layers as described with reference to FIGS. 8(a) and 8(b), and the number of rows not actually presenting in the uppermost layer, are all set in the control panel 60.

In the case where the arrangement of the tubular workpieces in the stack is as shown in FIG. 8(b), wherein all rows present in the uppermost layer (C=0), the device of the present invention operates as follows.

Firstly, the number of the rows in the uppermost layer is judged whether it is A or B. Since a shift switch in the control panel 60 is turned to A in this case, the next step of "whether MC=A or not" is executed. Since the number of rows MC having been delivered to the workpiece receiving pedestal 56 is not yet equal to A, the electric motor 21 operates at a high speed thereby shifting the movable frame 20 leftwardly.

When the proximity switch 52 senses the first dog 49a, the dog count of the counter CC is checked if it is equal to 1+MC or not. Since MC=0 at this time, this condition is satisfied and the running speed of the electric motor 21 is slowed down. When the proximity switch 52 senses the second dog 49b, the movable frame 20 carrying the workpiece carrying bar 40 is stopped.

The hydraulic cylinder 25 is then operated to lower the pick-up member 26.

When the feeler 35 comes to the proximity of the upper surface of one of the tubular workpieces forming the uppermost layer of the stack on the truck 12a, the lowering speed of the pick-up member is slowed down. When the feeler 35 contacts the upper surface of the tubular workpiece, the downward movement of the pick-up member 26 is interrupted by the limit switch 64. The position of the feeler 35 of the detecting member 36 has been adjusted in such a manner that the workpiece carrying bar 40 substantially aligns with the center line of the first row in the uppermost layer of the stacked tubular workpieces 15 at a time when the feeler 35 contacts the upper surface of the same row.

When the positioning of the workpiece carrying bar 40 has been completed as described above, the hydraulic motor 41 is operated by a signal issued from the workpiece detecting device 31. The rollers 38a and 38b are thus rotated to advance the workpiece carrying bar 40 through the inner bores of the tubular workpieces 15 aligned in the first row of the uppermost layer. The extremity of the forward movement of the workpiece carrying bar 40 is detected by the contact of the engaging piece 45 with the forward limit switch 44, and the operation of the hydraulic motor 41 is interrupted upon operation of the switch 44.

The operation of the limit switch 44 further causes the hydraulic cylinder 25 to move the pick-up member 26 upwardly, and the workpiece carrying bar 40 is thereby elevated upwardly while supporting the first row of the tubular workpieces thereon.

When the engaging piece 30 provided on one of the guide bars 27 abuts against the limit switch 29a, the upward movement of the pick-up member 26 is interrupted. The operation of the limit switch 29a further energizes the driving motor 21, thereby driving the movable frame 20 rightwardly toward the transferring mechanism 16 (counter CC is reset when the movable frame passes the original position "a" rightwardly).

When the movable frame 20 is moved to a position vertically aligned with the workpiece receiving pedestal 56 of the workpiece transferring mechanism 16, the rightward movement limiting switch 61 is operated. The operation of the switch 61 stops the movement of the movable frame 20 and lowers the pick-up member 26. When the feeler 35 detects the fact that the tubular workpieces carried on the workpiece carrying bar 40 are received by the workpiece receiving pedestal 56 of the workpiece transferring mechanism 16, the workpiece carrying bar 40 is caused to retract by the reverse movement of the hydraulic motor 41 leaving the tubular workpieces on the pedestal 56 and incrementing the count of MC counter by 1. The tubular workpieces thus remaining on the pedestal 56 are then transferred by the workpiece transferring mechanism 16 to a subsequent stage where the workpieces are combined with the mating members such as sections of pipes.

Upon retraction of the workpiece carrying bar 40 to the retracted position, the limit switch 46 is operated by the engaging piece 45. The operation of the limit switch 46 starts to operate the hydraulic cylinder 25 to raise the pick-up member 26 upwardly until the limit switch 29a is operated. Upon operation of the limit switch 29a, the driving motor 21 is operated to move the movable frame 20 leftwardly, and when the movable frame 20 passes the original position "a", the operation of the entire device is returned to the starting state of the cycle described hereinbefore with the exception that the MC counter counts 1.

The first part of the operation steps is then repeated for driving the movable frame 20 leftwardly at a high speed until the proximity switch 52 sensing the dogs increments the counter CC to a count $1+MC=2$. That is, when the proximity switch 52 senses the second dog 49b, the driving speed of the movable frame is reduced, and when the switch 52 senses the third dog 49c, the movable frame 20 stops.

While the second row of the tubular workpiece in the uppermost layer is taken out of the stack and delivered onto the receiving pedestal 56 of the workpiece transferring mechanism 16, the counter CC is reset and the MC counter is incremented by 1 to become 2.

The above described operation is further repeated until the last row of the tubular workpieces in the uppermost layer is taken out of the stack and delivered onto the workpiece receiving pedestal 56.

When the last row is removed, the MC counter counts A ($MC=A$), and therefore, in the above described arrangement of rows of the tubular workpieces, the shift switch in the control panel 60 is transferred to B. The MC counter is thereby reset to zero, and the counter CC has also been reset during the rightward pass of the original position "a". The movable frame 20 is then shifted leftward at a high speed from the position vertically aligned with the workpiece receiving pedestal 56 of the workpiece transferring mechanism 16.

Again, the number of dogs 49 is counted, and the above described operations are repeated until the last row in the second layer of the stack are delivered to the workpiece receiving pedestal 56 while the MC counter in the control panel 60 counts B ($MC=B$). The shift switch in the control panel 60 is turned to A, and the third layer of the stack is removed as described above.

When all the layers in the stack are removed, the lower limit switch 29b is operated, and the movable frame 20 and the pick-up member 26 are driven to send back the workpiece carrying bar 40 to the original position "a".

Although in the above description it has been assumed that the arrangement of the rows of tubular workpieces is staggered as shown in FIG. 8(b), and the numbers of rows A and B are set in the row number setting switches in the control panel 60, it is apparent that the tubular workpiece supplying device according to this invention may also be applied to the arrangement shown in FIG. 8(a).

In this case, a number of rows, A, is set in both of the row number setting switches, and therefore the same operation is repeated for all the layers of the stack of the tubular workpieces.

Furthermore, where a certain number of rows C does not present in the righthand portion (rightward portion) of the uppermost layer, that is, where $MC=C\neq0$, upon initiation of the cycle start, the movable frame 20 is shifted from the original position "a" leftwardly at a high speed until the counter CC counts $C+1$. When the counter CC counts $C+1$, the speed of the movable frame is reduced, and the movable frame 20 is stopped when the counter CC counts ($C+2$), that is, when the next following dog is sensed by the proximity switch 52. The operation thereafter of the device according to the present invention is similar to that described above.

Although the operation of the device according to the present invention has been described with respect to a preferred embodiment thereof, it is apparent to those skilled in the art that various modifications may also be carried out within the scope of the present invention. For instance, a layer number setting switch and a layer number counter may further be provided in the control panel 60 for controlling the lowering operation of the pick-up member 26 and for detecting the completion of the supply of the tubular workpieces loaded on a truck to the subsequent stage.

We claim:

1. A device for automatically supplying tubular workpieces, comprising at least one carriage reciprocable between a loading position and an unloading position, in the former position the carriage being loaded with a stack of tubular workpieces in the form of a plurality overlayed layers, each including a plurality of transversely aligned rows, and each row including a number of longitudinally aligned tubular workpieces and in the latter position the tubular workpieces thus stacked up being delivered sequentially, a stationary horizontally extending structural frame provided near the unloading position, a movable frame reciprocable horizontally on the structural frame in a direction perpendicular to the length of the tubular workpieces stacked up on the carriage, a pick-up member mounted on the movable frame to be movable vertically, a workpiece carrying bar provided on the pick-up member to be reciprocable horizontally in the longitudinal direction of the tubular workpieces through the internal bores of the tubular workpieces arranged in a row, and means for controlling the movable frame and the pick-up member so that the axial line of the workpiece carrying bar successively coincides with the longitudinal axes of the tubular workpieces stacked up on the carriage in layers and rows.

2. A device as set forth in claim 1 wherein the number of the carriages is selected to be two which are alternately reciprocated between their respective loading positions and a single unloading position by means of hydraulic devices.

3. A device as set forth in claim 1 wherein said means for controlling the pick-up member comprises a detecting device mounted on the pick-up member for detecting the upper surface level of the tubular workpieces stacked up on each carriage, and for controlling the lowering movement of the pick-up member.

4. A device as set forth in claim 1 wherein said means for controlling the movable frame comprises a plurality of dogs provided on the structural frame at positions corresponding to those of the tubular workpieces arranged in rows in each layer, and a proximity switch secured to the movable frame for sensing said plurality of dogs.

5. A device as set forth in claim 3 which further comprises means for controlling said workpiece carrying bar so that the latter advances when said detecting device detects the upper surface level of the tubular workpieces stacked up on the carriage, and retracts when said detecting device detects the upper surface of a workpiece receiving pedestal.

6. A device as set forth in claim 4 wherein said means for controlling said movable frame further comprises a counter counting the number (CC) of dogs sensed by the proximity switch, a comparator which compares the number (CC) thus counted with a number (MC+1), wherein MC is equal to a number of rows delivered in a layer in said stack, and means for holding at a high value the moving speed of the movable frame when the number (CC) is not equal to (MC+1), whereas when (CC) is equal to (MC+1), reducing the moving speed of the movable frame.

7. A device as set forth in claim 4 wherein said means for controlling said movable frame further comprises a counter counting the number (CC) of dogs sensed by the proximity switch, a counter counting the number (MC) of rows of the tubular workpieces delivered to a subsequent stage, a first comparator comparing the number (MC) with either one of two set values (A and B), a shift switch which shifts said dogs for a predetermined distance and selects the other set value (B or A) when the number (MC) is equal to said one of two set values (A and B), a second comparator for comparing the number (CC) with the number (MC), a third comparator comparing the number (CC) with a number (MC+1), a first flip-flop set by the output of said second comparator for reducing the moving speed of said movable frame, and a second flip-flop reset by the output of said third comparator for stopping the movement of said movable frame.

* * * * *